United States Patent
Glad et al.

(10) Patent No.: US 7,352,753 B2
(45) Date of Patent: Apr. 1, 2008

(54) METHOD, SYSTEM AND MIRROR DRIVER FOR LAN MIRRORING

(75) Inventors: Lauri Glad, Helsinki (FI); Mauri Saksio, Espoo (FI)

(73) Assignee: Nokia Corporation, Espoo (FI)

( * ) Notice: Subject to any disclaimer, the term of this patent is extended or adjusted under 35 U.S.C. 154(b) by 1032 days.

(21) Appl. No.: 10/331,953

(22) Filed: Dec. 31, 2002

(65) Prior Publication Data

US 2004/0139123 A1   Jul. 15, 2004

(51) Int. Cl.
H04L 12/28 (2006.01)
H04L 12/56 (2006.01)

(52) U.S. Cl. .................. 370/395.53; 370/428; 370/412

(58) Field of Classification Search ...................... None
See application file for complete search history.

(56) References Cited

U.S. PATENT DOCUMENTS

| | | | |
|---|---|---|---|
| 6,104,696 A * | 8/2000 | Kadambi et al. | 370/218 |
| 6,446,131 B1 | 9/2002 | Khansari et al. | |
| 6,728,672 B1 * | 4/2004 | Will | 704/233 |
| 6,856,599 B1 * | 2/2005 | Kroon | 370/236 |
| 2002/0075873 A1 | 6/2002 | Lindhorst-Ko et al. | |
| 2004/0143578 A1 * | 7/2004 | Margolus et al. | 707/10 |
| 2004/0143745 A1 * | 7/2004 | Margolus et al. | 713/176 |
| 2004/0148376 A1 * | 7/2004 | Rangan et al. | 709/223 |
| 2004/0255140 A1 * | 12/2004 | Margolus et al. | 713/193 |

FOREIGN PATENT DOCUMENTS

EP   0 963 082 A2   12/1999

* cited by examiner

*Primary Examiner*—Chirag G. Shah
(74) *Attorney, Agent, or Firm*—Squire, Sanders & Dempsey, LLP

(57) ABSTRACT

The present invention discloses a method, system and mirror driver for detecting duplicated frames in a mirrored data communication network system comprising at least one sender, at least one receiver and at least two data communication networks between the sender and receiver. Each receiver creates and maintains at least one data structure comprising one or more entries, an entry comprising key information for each one of the received data frames. When a data frame is received via a data network, an index to the data structure is computed based on information acquired from the received data frame. If the entry corresponding to the computed index is empty or the entry does not comprise key information matching the key information in the received data frame, key information of the received data frame is stored on the entry and the data frame is forwarded onwards.

33 Claims, 8 Drawing Sheets

METHOD, SYSTEM AND MIRROR DRIVER FOR LAN MIRRORING

FIELD OF THE INVENTION

The present invention relates to mobile telecommunication systems. In particular, the present invention relates to a novel and improved method, system and mirror driver for detecting duplicated frames in a mirrored data communication network system.

BACKGROUND OF THE INVENTION

Fault tolerance is a desirable property for several communication networks. In Local Area Networks (LAN), mirroring may be used for providing fault tolerance. In general, LAN mirroring means that data frames sent between a sender and a receiver are sent via multiple physically separate LANs (two or more). The basic idea behind LAN mirroring is that it is highly unlikely that all duplicates of a data frame would disappear. Therefore, the receiver will receive at least one of the data frames. Usually redundant LAN architectures assume that a failure in one LAN is usually isolated from another LAN(s). Thus, a node can communicate with other nodes even if one LAN cannot be used to send data frames to the other nodes.

FIG. 1 describes a simple system architecture for LAN mirroring. FIG. 1 comprises a sender, a receiver and two distinct LANs LAN1, LAN2, which connect the sender and receiver to each other. The sender sends a data frame #X via both LANs to the receiver. Although the main idea behind using LAN mirroring is very simple, there still exist some difficulties that must be taken care of:

The receiver must discard the duplicates, i.e. the receiver must know which frames it must accept and which to reject.

LAN mirroring must be transparent to upper level protocols (e.g. Internet Protocol (IP) and Address Resolution Protocol (ARP)).

Therefore, the major requirement of the mirroring system is that it must be possible to uniquely identify each sent data frame/message. This is important because each frame should be passed to the application level only once, even if it has been received more than once. On the other hand, when there are no problems on any of the separate LANs, data frames are typically received more than once.

SUMMARY OF THE INVENTION

The present invention discloses a method, system and mirror driver for detecting duplicated frames in a mirrored data communication network system comprising at least one sender, at least one receiver and at least two data communication networks between the sender and receiver. The communication networks are preferable Local Area Networks (LAN). The receiver of data frames creates and maintains at least one data structure comprising one or more entries, an entry comprising key information for each one of the received data frames. In a preferred embodiment, the data structure is a hash table.

When a data frame is received via a data communication network, an index to the data structure is computed based on information acquired from the received data frame. Key information refers e.g. to at least two of the following: a sender address, a receiver address, a data frame identifier, or a checksum. If the entry corresponding to the computed index is empty or the entry does not comprise the key information matching the key information in the received data frame, the key information of the received data frame is stored on the entry and the data frame is forwarded onwards.

However, if the entry comprises the key information matching the key information in the received data frame, the received data frame is discarded (i.e. the same data frame has already been received earlier and passed to upper software levels) and the corresponding key information is deleted from the entry.

In one embodiment of the present invention, the index to the data structure is computed based on the source address and data frame identifier. The data frame identifier may be incorporated in one of a mirror hearer, a VID field in the VLAN tag or 802.2 SNAP org field.

In another embodiment of the present invention, the index to the data structure is computed based on the source address and destination address. Also further information can be used additionally in computing the index, e.g. a data frame identifier or a checksum value.

In one embodiment, timed-out pieces of key information are deleted from the data structure. The deleting may be based e.g. on time stamps. In this case, every key information comprising an older time stamp than a predetermined threshold value is deleted.

The present invention discloses also a system for detecting duplicated frames in a mirrored data communication network system comprising creating and maintaining means for creating and maintaining at least one data structure comprising one or more entries, an entry comprising key information for each one of the received data frames, receiving means for receiving a data frame, computing means for computing an index to the data structure based on the key information acquired from the received data frame, storing means for storing key information of the received data frame on the entry, forwarding means for forwarding the data frame onwards, discarding means for discarding the received data frame and deleting means for deleting the corresponding key information from the entry.

In one embodiment of the present invention, the system further comprises placing means for placing a data frame identifier in one of a mirror hearer, a VID field in the VLAN tag or 802.2 SNAP org field.

In one embodiment of the present invention, computing means are arranged to compute the index to the data structure based on the source address and data frame identifier. The data frame identifier may be incorporated in one of a mirror hearer, a VID field in the VLAN tag or 802.2 SNAP org field.

In another embodiment of the present invention, computing means are arranged to compute the index to the data structure based on the source address and destination address.

In one embodiment of the present invention, deleting means are arranged to delete timed-out pieces of key information from the data structure. Furthermore, in one embodiment deleting means are arranged to delete every key information comprising an older time stamp than a predetermined threshold value.

The aforementioned means are preferably arranged in a mirror driver.

The present invention has several advantages over the prior-art solutions. In one embodiment, the present invention does not cause any changes into the standardized Ethernet frame. There are also several other advantages in the use of hashing based dropping algorithm. The use of hashing 'disconnects' the sender(s) and the receiver(s). In other words, a sender is not required to use any particular algorithm for generating the data frame identifiers. Similarly, there is no requirement for the receivers to use exactly the same dropping algorithm. In fact any (non-hashing based) dropping algorithm with the same 'connectionless' property can be used along with the solution described in the present invention. The mirroring protocol can also be designed to be stateless.

A hashing based algorithm can easily be generalized to support any number of redundant networks and it can be made to be rather efficient in case of e.g. exceptional situations like loss of a redundant network e.g. due to maintenance operations.

Furthermore, the solution described in the present invention can be implemented as well in the data link layer (L2) as in the network layer (L3) or transport layer (L4). The solution described in the present invention is also easy and simple to implement.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
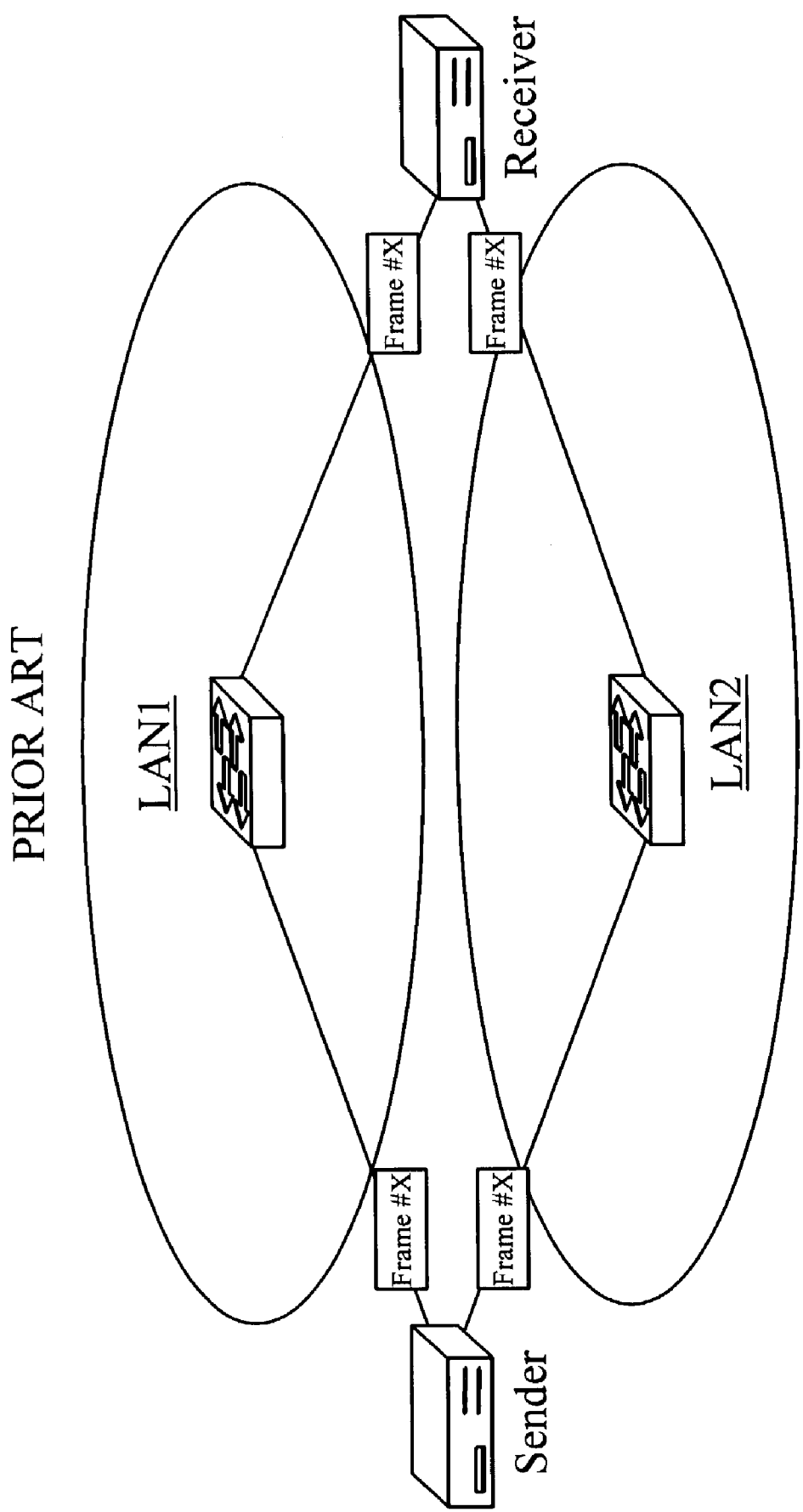
FIG. 1 illustrates a simplified prior art system architecture illustrating the mirroring concept of data communication networks.
Figure 2:
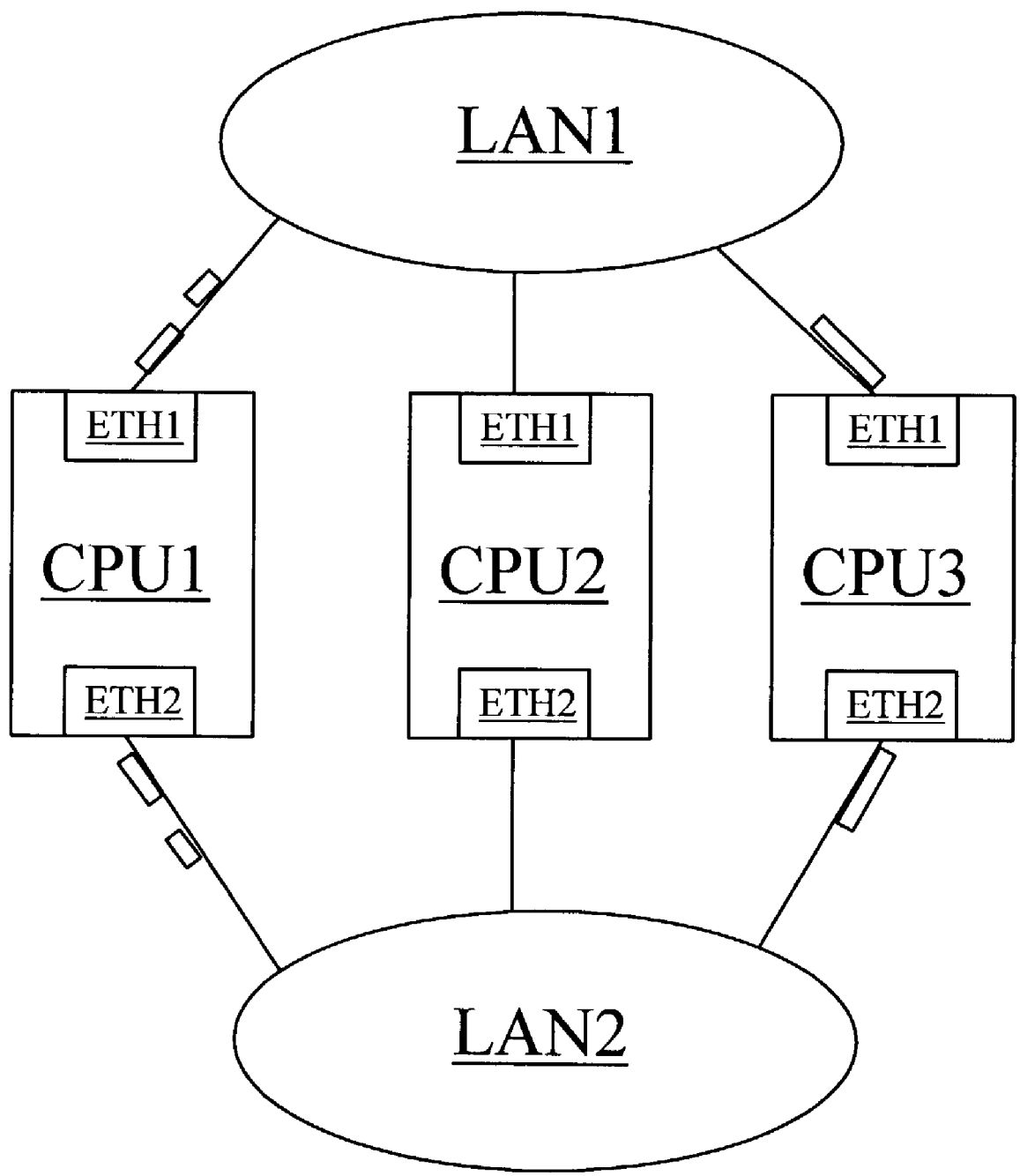
FIG. 2 illustrates one embodiment of the system in accordance with the present invention.

FIG. 2 illustrates a possible local area network configuration that can be used in accordance with the present invention. The system comprises two data communication networks, Local Area Networks LAN1 and LAN2. Three computer units CPU1, CPU2, CPU3 are connected to the local area networks LAN1, LAN2. Each of the computer units CPU1, CPU2, CPU3 have two local area network interfaces ETH1, ETH2 which are connected to the physically separated local area networks LAN1, LAN2.

Figure 3:
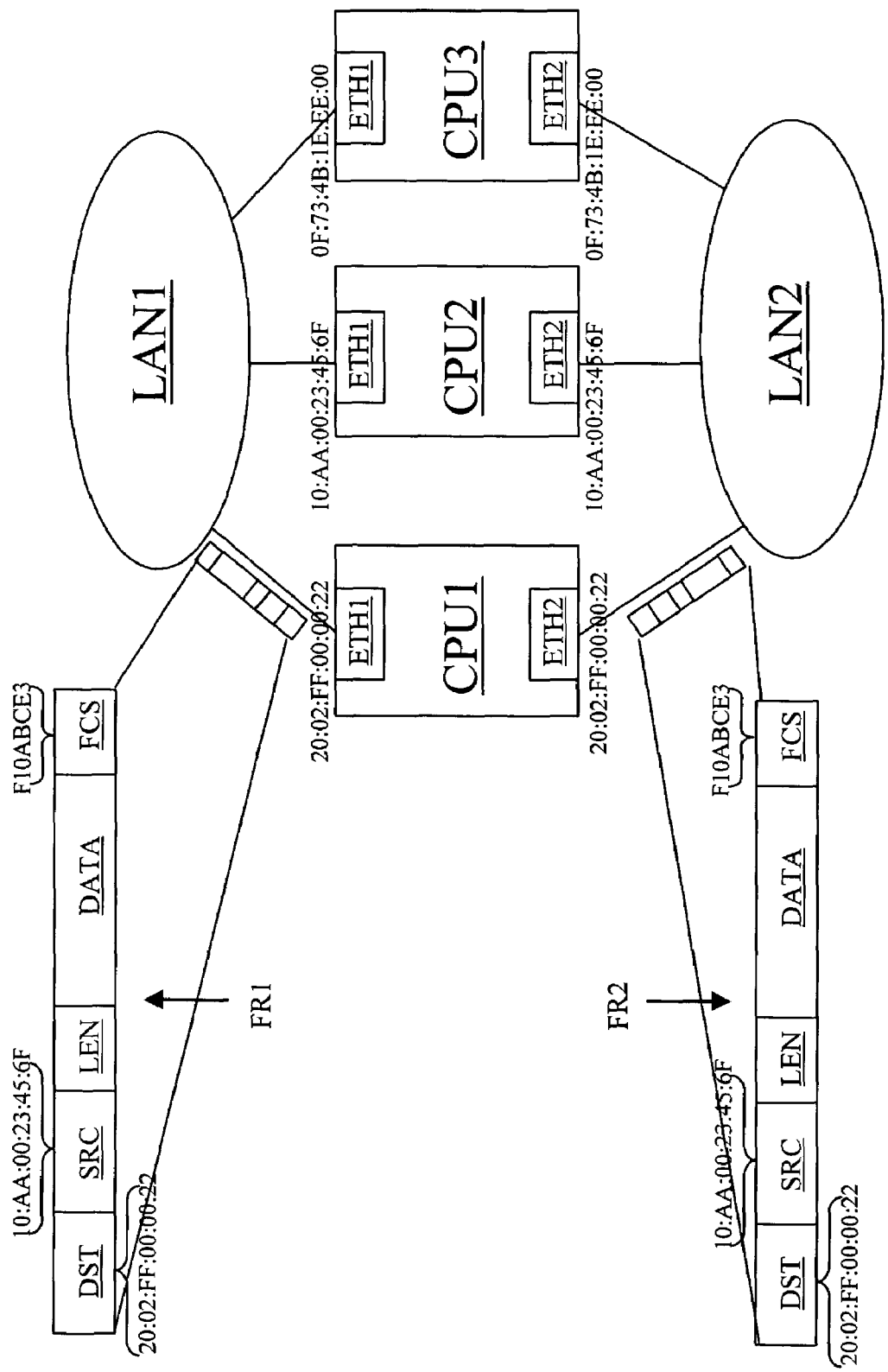
FIG. 3 illustrates another embodiment of the system in accordance with the present invention.

FIG. 3 is a more detailed version of FIG. 2. In FIG. 3, the Media Access Control (MAC) addresses of the interfaces ETH1, EHT2 are the same (per a computer unit). Also mirrored data frames FR1, FR2 are identical. The data frames FR1, FR2 comprise at least a destination MAC address DST, a source MAC address SRC, a length field LEN, a data field DATA and a checksum FCS. The checksum is a 32-bit Cyclic Redundancy Checking (CRC) checksum.

Figure 4:
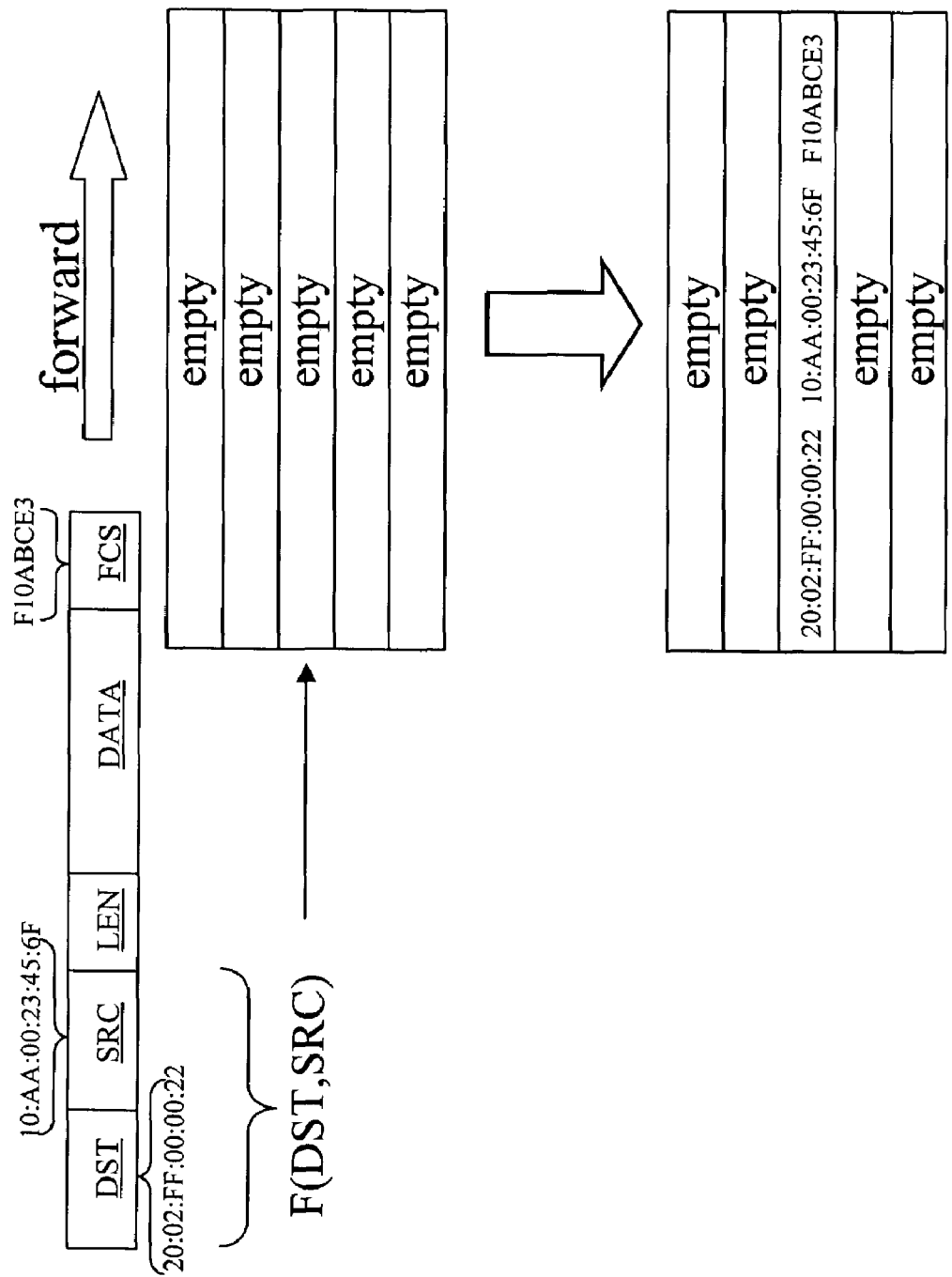
FIG. 4 illustrates how a data frame received first is handled in one embodiment in accordance with the present invention.

FIG. 4 describes an embodiment how a data frame received first is handled. Selected fields of the data frame are used to compute an index to a data structure, e.g. a hash key to a hash table. In the example described in FIG. 4, source and destination MAC addresses are used to form a hash key, which is an index to the hash table. Also other fields can be used instead or additionally, e.g. the checksum value in the FCS field. When it is noted that the corresponding entry in the hash table does not comprise the key information (e.g. the destination address, source address and checksum combination), the data frame is forwarded to upper software levels and the hash table is updated by including the aforementioned key information in the entry. Sending an Ethernet data frame does not require any extra processing. The data frame is handled by the software driver and the MAC device driver exactly in a way any Ethernet data frame is handled. In the example of FIG. 4, the only requirement is that the use of Frame Check Sequence (FCS) must be enabled.

Figure 5:
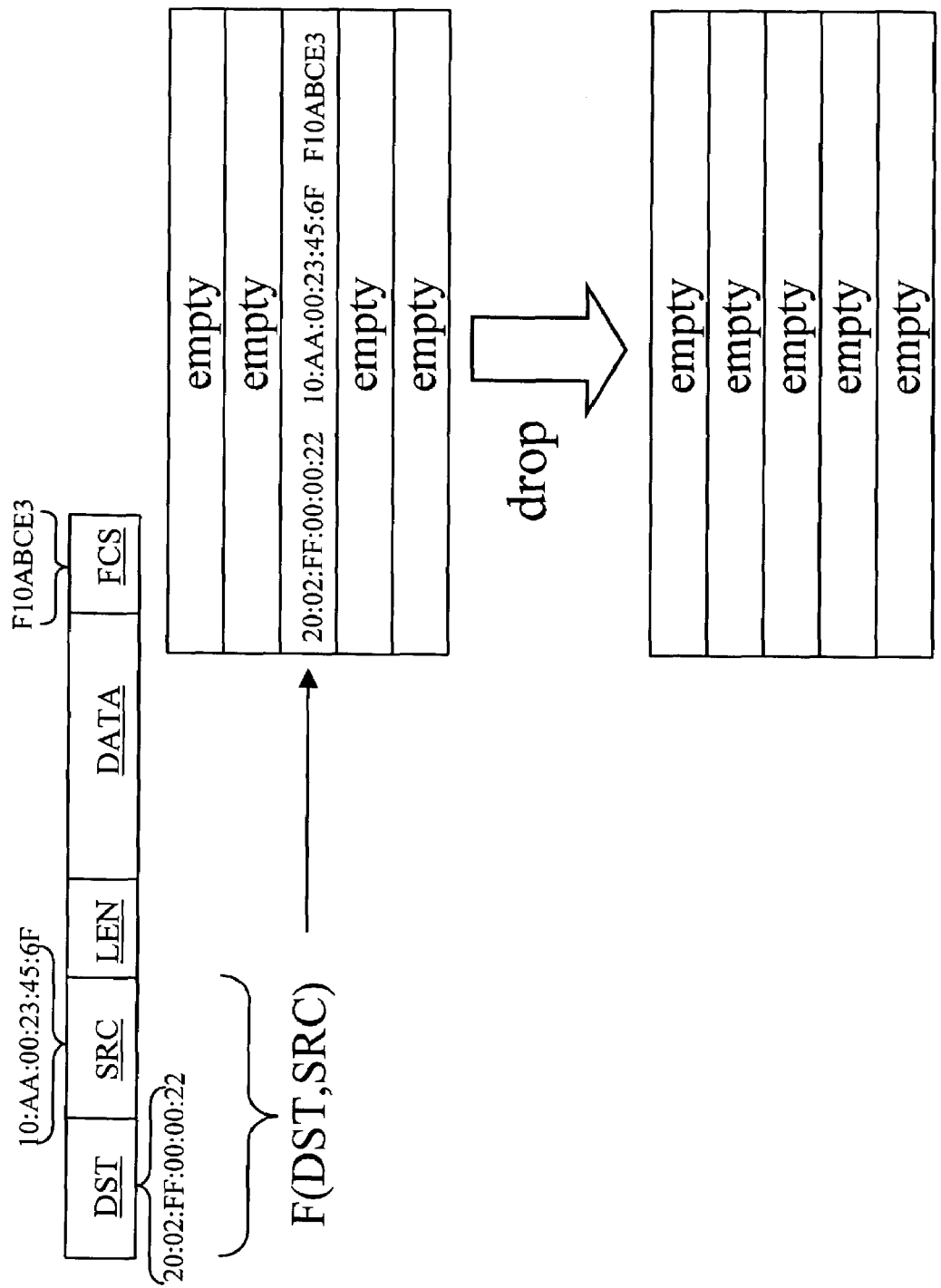
FIG. 5 illustrates how a data frame received after the first data frame is handled in one embodiment in accordance with the present invention.

FIG. 5 describes a situation when a copy of a data frame already received arrives. The MAC device driver passes the received data frame to a mirror driver. The mirror driver can be implemented as well in the data link layer (L2) as in the network layer (L3) or transport layer (L4). The mirror driver receives the original Ethernet frame, which contains not only the data but also source SRC and destination MAC addresses DST, length LEN of the data frame, possibly some other fields and the checksum FCS. The received data frame has the same contents as the one in FIG. 4.

As described in FIG. 5, source and destination MAC addresses are used to form a hash key, which is an index to the hash table. Because the first data frame has already been received, the pointed entry is not empty but contains one or more records of key information (destination address DST, source address SRC, checksum FCS). The records within the entry are checked to see if any of them matches to the one in the received data frame. If a match is found, the data frame is dropped (destroyed) because it has already been received earlier. Furthermore, the corresponding key information is deleted from the entry.

The example described in FIG. 5 assumes that the checksum in the FCS field is computed and the checksum is preserved and available to upper software levels (to the mirror driver).

The examples described in FIGS. 4 and 5 assume that each computer unit has and uses the same MAC address for all of the Ethernet interfaces of that particular computer unit because the MAC address(es) is/are are used when computing the checksum in the FCS field. Therefore, the data frames received from different Ethernet interfaces will be recognized to be the same only if the MAC addresses are the same. Furthermore, the examples described in FIGS. 4 and 5 use a hash table and a hash function. It is clear that any appropriate data structure other than a hash table can be used. Correspondingly, the function used in computing an index to the data structure does not have to be a hash function but any other appropriate function can be used.

Figure 6:
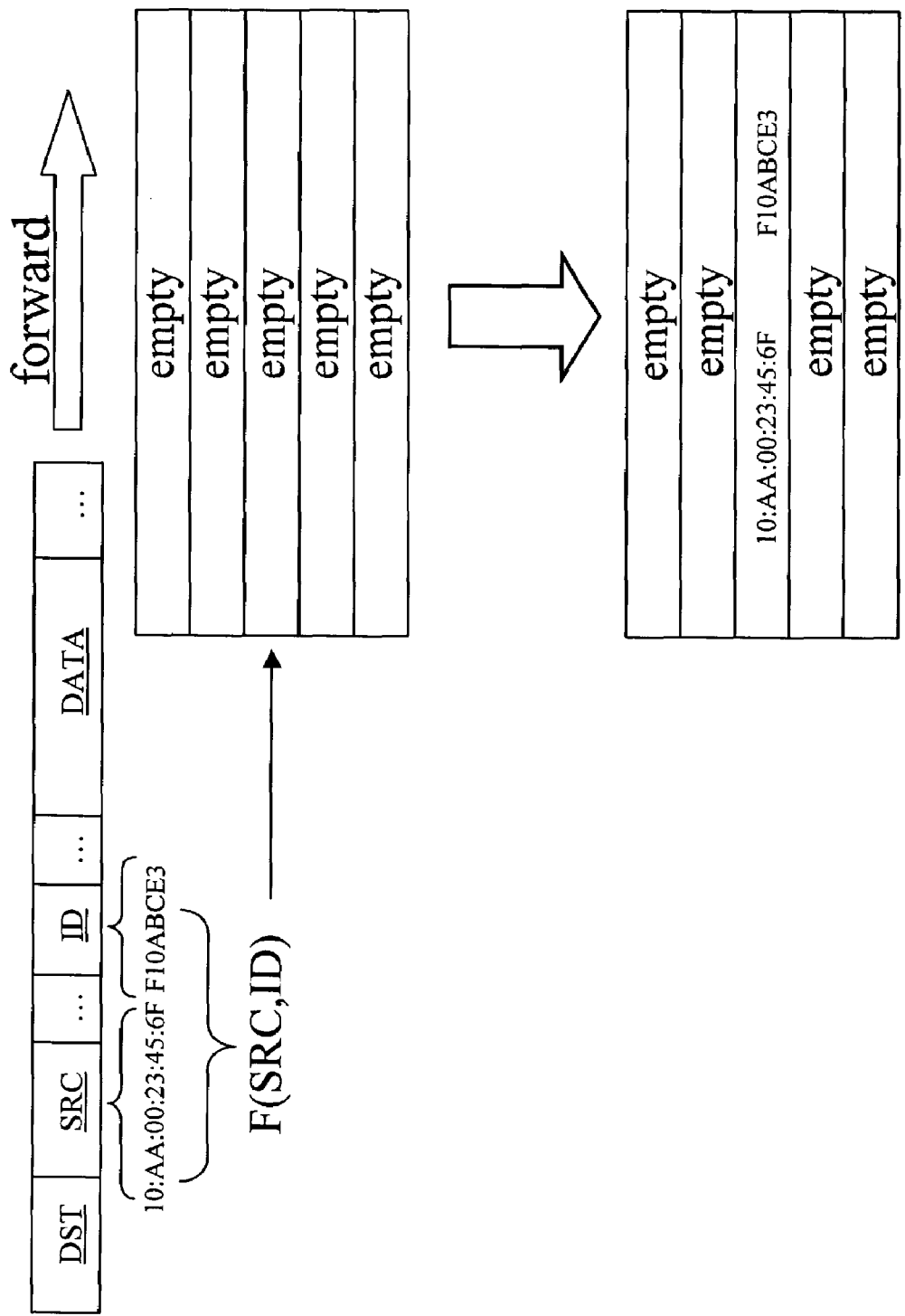
FIG. 6 illustrates how a data frame received first is handled in another embodiment in accordance with the present invention.

FIG. 6 describes another embodiment how a data frame received first is handled. Selected fields of the data frame are used to compute an index to a data structure, e.g. a hash key to a hash table. In the example described in FIG. 6, the source MAC address SRC and data frame identifier ID are used to form a hash key which is an index to the hash table.

When it is noted that the corresponding entry in the hash table does not comprise the key information (e.g. the source address SRC and data frame identifier ID combination), the data frame is forwarded to upper software levels and the hash table is updated by including the aforementioned key information in the entry.

Figure 7:
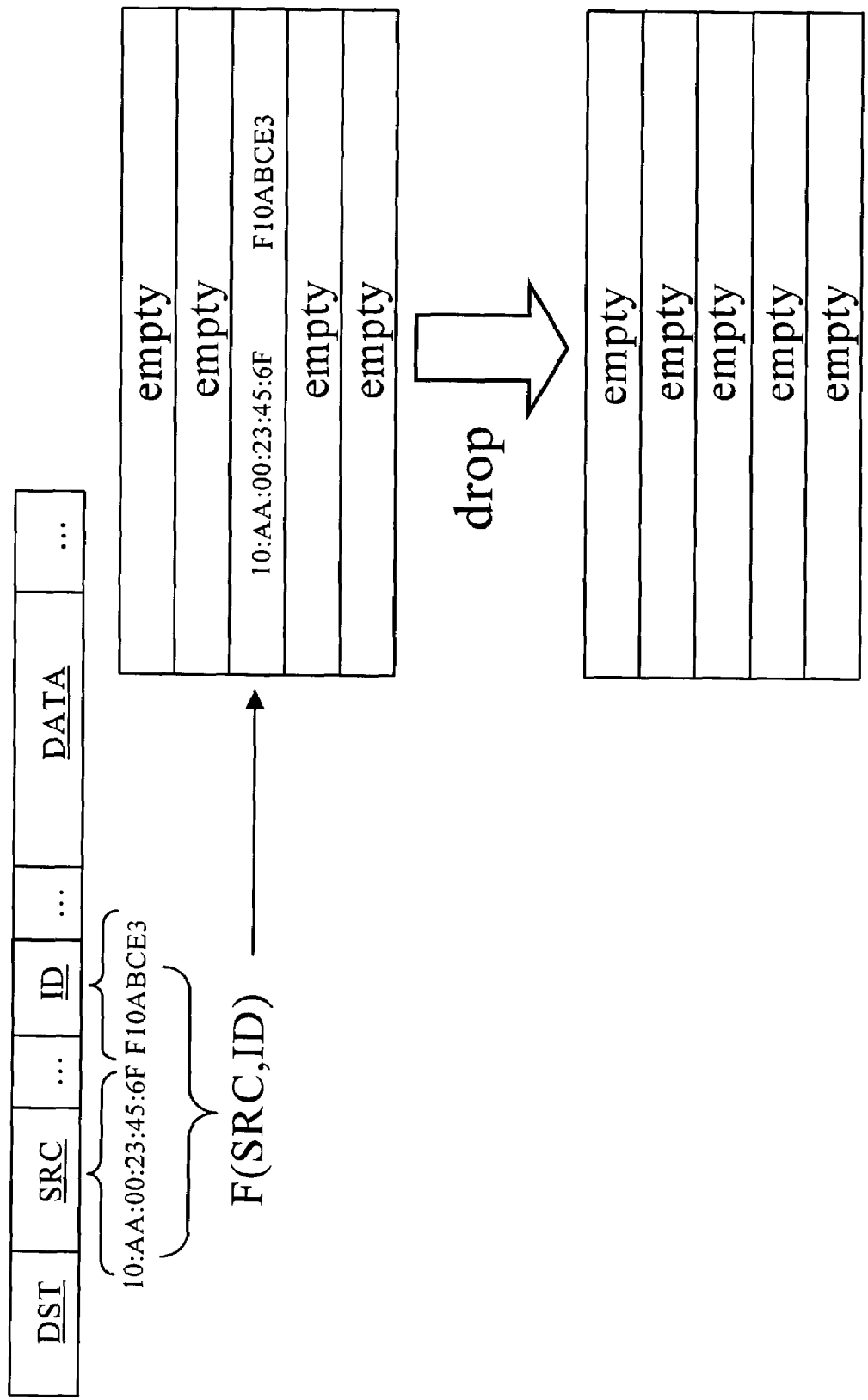
FIG. 7 illustrates how a data frame received after the first data frame is handled in another embodiment in accordance with the present invention.

FIG. 7 describes a situation when a copy of a data frame already received arrives. The received data frame has the same contents as the one in FIG. 6. The MAC device driver passes the received data frame to a mirror driver. The mirror driver receives the original Ethernet frame, which contains not only the data but also at least the source SRC and destination MAC addresses DST and the data frame identifier ID.

As already described with FIG. 7, the source MAC address and data frame identifier ID are used to form a hash key which is an index to the hash table. Because the first data frame has already been received, the pointed entry is not empty but contains one or more records of key information (source address SRC, data frame identifier ID). The records within the entry are checked to see if any of them matches to the one in the received data frame. If a match is found, the data frame is dropped (destroyed) because it has already been received earlier. Furthermore, the corresponding key information is deleted from the entry.

In one embodiment of FIGS. 4, 5, 6 and 7, the hash function used is the following well-known hash function: h(key)=key mod N, wherein N is a prime number and defines the size of the hash table. Hence, the key would be a large integer formed from the source MAC address and the frame identifier or form source and destination addresses, and N would be a prime number, e.g. 101. It must be noted that any other appropriate hash function as described above can be used. For large integers like the combination of six octet MAC address and two octet frame identifier, the well-known additive calculation method can be used e.g. as follows:

$$h=k[1] \text{ for } j=2 \text{ to [size of the key]} \{h=((h*256)+k[j]) \bmod M\}.$$

As described in the descriptions of FIGS. 5 and 7, the pointed entry may contain several separate records of key information (source address SRC, data frame identifier ID or source address SRC, destination address DST and checksum FCS). As the time passes, the hash table may fill up for some reason. Therefore, the hash table may have to be cleared from timed-out entries. In the following, a simplified example is described for clearing the hash table.

There are two counters if_0 and if_1 initialized to be zero. The use of these counters is fairly simple: if either one of these frame counters remains zero, frames received from the other interface can be accepted. This is likely to happen if the other one of the data networks is not operating e.g. because of maintenance operations. Furthermore, as the counters are incremented each time a key is stored into the hash table, the sum total of these counters also exactly determines the fill ratio of the hash table (i.e. fill ratio=[size of the hash table]/(if_0+if_1)). This information is needed in order to prevent the hash table to slowly becoming full.

As described above, an entry may contain several separate records of key information. These records can be stored as fixed size ring buffers, which act as collision areas, one buffer for each primary entry in hash table. The condition (T=(if_0+if_1))>M*Y is interpreted as follows:

T=the total number of entries in the hash table.
if_0=number of entries from frames from interface ETH1.
if_1=number of entries from frames from interface ETH2.

M=a predefined constant for calculating a threshold for acceptable number of entries in the hash table, e.g. M=N div 2

Y=the size of the fixed per entry collision areas, e.g. if N=101 and we fix Y=10 then size of the hash table is 101+10*101=1111, and the threshold for the maximum number of entries in the hash table is 50*10=500. Note that with other ways of handling the collisions the threshold might well be the same as the total size of the collision hash table (primary entries+collision area).

Therefore, if condition T=(if_0+if_1))>M*Y is true, the hash table is initialized (cleared) and the values of the interface counters if_0 and if_1 are set to zero.

Handling collisions is an issue that can be solved in several ways. Above was described a solution in which fixed size collision areas per hash entry were used. This is, however, only one possible solution for managing the hash table and any other appropriate solution can be used. For example, in another embodiment, each key information in an entry in the hash table can be provided with a time stamp. When a time stamp is considered to be timed-out (i.e. pieces of key information too old to be valid anymore), the key information in question is deleted from the hash table.

Figure 8:
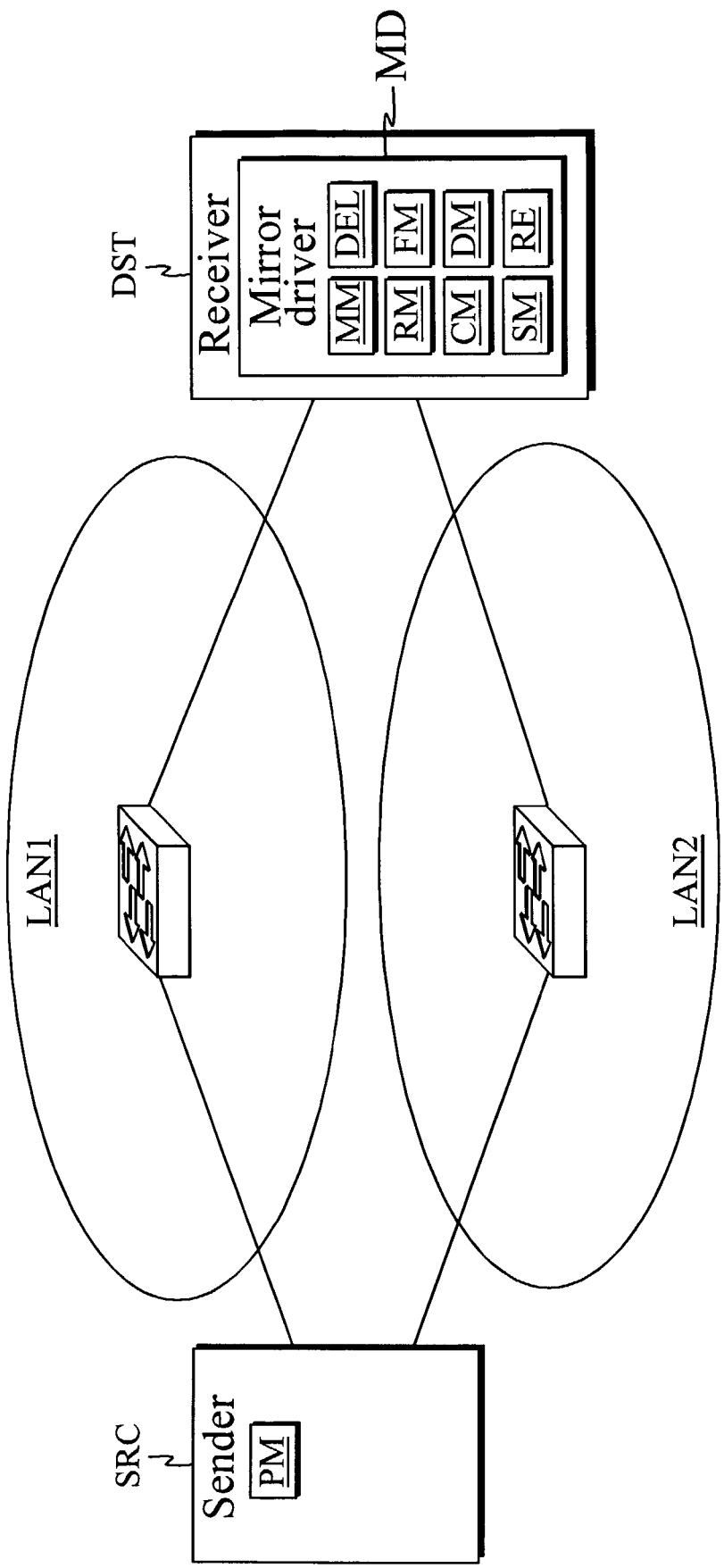
FIG. 8 illustrates an embodiment of the system in accordance with the present invention.

FIG. 8 illustrates one embodiment of the system in accordance with the present invention. The simplified system comprises a source SRC that sends data frames via both local area networks LAN1, LAN2 to a receiver DST. The sender SRC and receiver DST are implemented in a way known to a man skilled in the art e.g. by means of software and/or hardware. The sender SRC comprises placing means PM for placing a data frame identifier in one of a mirror hearer, a VID field in the VLAN tag or 802.2 SNAP org field. A data frame identifier is sufficiently unique for each sender. Sufficiently unique means that within a sender defined period all the frame identifiers must be unique. The receiver, however, does not have to know what the exact period is.

Furthermore, the receiver DST comprises a mirror driver MD that can be implemented as well in the data link layer (L2) as in the network layer (L3) or transport layer (L4). The mirror driver comprises creating and maintaining means MM for creating and maintaining at least one data structure comprising one or more entries, an entry comprising key information for each one of the received data frames, receiving means RM for receiving a data frame, computing means CM for computing an index to the data structure based on key information acquired from the received data frame, storing means SM for storing key information of the received data frame on the entry, forwarding means FM for forwarding the data frame onwards, discarding means DM for discarding the received data frame and deleting means DEL for deleting key information from an entry. The mirror driver MD comprises also reading means RE for reading a data frame identifier from one of a mirror hearer, a VID field in the VLAN tag or 802.2 SNAP org field.

The aforementioned means can be implemented in a way known to a man skilled in the art, e.g. by means of software and/or hardware.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method for detecting duplicated frames in a mirrored data communication network system, the method comprising:

creating and maintaining at least one data structure comprising one or more entries, an entry comprising key information for each one of the received data frames;

receiving a data frame via a data communication network;

computing an index to the data structure based on information acquired from the received data frame, the index pointing to an entry in the data structure; and when the entry corresponding to the computed index is empty or the entry does not comprise key information matching the key information in the received data frame, storing the key information of the received data frame on the entry; and forwarding the data frame to an upper software layer;

when the entry corresponding to the computed index comprises the key information matching the key information in the received data frame, the method further includes, discarding the received data frame; and deleting the corresponding key information from the entry, wherein the mirrored data communications network system includes at least one sender, at least one receiver and at least two redundant physically separate data communication networks between the sender and receiver.

2. The method according to claim 1, wherein in the computing step: computing the index to the data structure based on at least two pieces of the following information:
   a sender address;
   a receiver address;
   a data frame identifier; or
   a checksum.

3. The method according to claim 1, wherein key information within an entry comprises at least two of the following:
   a sender address;
   a receiver address;
   a data frame identifier;
   a checksum; or
   a time stamp.

4. The method according to claim 2, wherein the data frame identifier is incorporated in one of a mirror hearer, a virtual local area network identifier (VID) field in the virtual local area network (VLAN) tag or 802.2 standard network access protocol (SNAP) org field.

5. The method according to claim 2, wherein the checksum is a cyclic redundancy checksum in the frame check sequence field.

6. The method according to claim 1, wherein the data structure is a hash table.

7. The method according to claim 1, wherein the index to the data structure is computed by a hash function.

8. The method according to claim 1, wherein the method further comprises:
   deleting timed-out pieces of key information from the data structure.

9. The method according to claim 8, wherein the method further comprises:
   deleting every key information comprising an older time stamp than a predetermined threshold value.

10. The method according to claim 1, wherein the communication networks refer to local area networks.

11. A system for detecting duplicated frames in a mirrored data communication network system, the system comprising:

a creating and maintaining unit configured to create and maintain at least one data structure comprising one or more entries, an entry comprising key information for each one of the received data frames;

a receiving unit configured to receive a data frame;

a computing unit configured to compute an index to the data structure based on information acquired from the received data frame, the index pointing to an entry in the data structure;

a storing unit configured to store the key information of the received data frame on the entry, when the entry corresponding to the computed index is empty or the entry does not comprise key information matching the key information in the received data frame;

a forwarding unit configured to forward the data frame to an upper software layer;

a discarding unit configured to discard the received data frame, when the entry comprises the key information matching the key information in the received data frame; and a deleting unit configured to delete key information from an entry, when the entry comprises the key information matching the key information in the received data frame, wherein the mirrored data communication network system includes at least one sender, at least one receiver and at least two redundant physically separate data communication networks between the sender and receiver.

12. The system according to claim 11, wherein the computing unit is configured to compute the index to the data structure based on at least two pieces of the following information:
   a sender address;
   a receiver address;
   a data frame identifier; or
   a checksum.

13. The system according to claim 11, wherein key information within an entry comprises at least two of the following:
   a sender address;
   a receiver address;
   a data frame identifier;
   a checksum; or
   a time stamp.

14. The system according to claim 11, wherein the system further comprises a placing unit configured to place a data frame identifier in one of a mirror hearer, a virtual local area network identifier (VID) field in the virtual local area network (VLAN) tag or 802.2 standard network access protocol (SNAP) org field.

15. The system according to claim 11, wherein the system further comprises a reading unit configured to read a data frame identifier from one of a mirror hearer, a virtual local area network identifier (VID) field in the virtual local area network (VLAN) tag or 802.2 standard network access protocol (SNAP) org field.

16. The system according to claim 12, wherein the checksum is a cyclic redundancy checksum in the frame check sequence field.

17. The system according to claim 11, wherein the data structure is a hash table.

18. The system according to claim 11, wherein the index to the data structure is computed by a hash function.

19. The system according to claim 11, wherein the deleting unit is configured to delete timed-out pieces of key information from the data structure.

20. The system according to claim 19, wherein the deleting unit is configured to delete every key information comprising an older time stamp than a predetermined threshold value.

21. The system according to claim 11, wherein the communication networks refer to local area networks.

22. A mirror driver for detecting duplicated frames in a mirrored data communication network system, the mirror driver comprising:
   a creating and maintaining unit configured to create and maintain at least one data structure comprising one or more entries, an entry comprising key information for each one of the received data frames;
   a receiving unit configured to receive a data frame;
   a computing unit configured to compute an index to the data structure based on information acquired from the received data frame, the index pointing to an entry in the data structure;
   a storing unit configured to store key information of the received data frame on the entry when the entry corresponding to the computed index is empty, or the entry does not comprise key information matching the key information in the received data frame;
   a forwarding unit configured to forward the data frame to an upper software layer when the entry corresponding to the computed index is empty, or the entry does not comprise key information matching the key information in the received data frame;
   a discarding unit configured to discard the received data frame, when the entry comprises the key information matching the key information in the received data frame; and
   a deleting unit configured to delete key information from an entry, when the entry comprises the key information matching the key information in the received data frame,
   wherein the mirrored data communication network system includes at least one sender, at least one receiver and at least two redundant physically separate data communication networks between the sender and receiver.

23. The mirror driver according to claim 22, wherein the computing unit is configured to compute the index to the data structure based on at least two pieces of the following information:
   a sender address;
   a receiver address;
   a data frame identifier; or
   a checksum.

24. The mirror driver according to claim 22, wherein key information within an entry comprises at least two of the following:
   a sender address;
   a receiver address;
   a data frame identifier;
   a checksum; or
   a time stamp.

25. The mirror driver according to claim 23, wherein the data frame identifier is incorporated in one of a mirror hearer, a virtual local area network identifier (VID) field in the virtual local area network (VLAN) tag or 802.2 standard network access protocol (SNAP) org field.

26. The mirror driver according to claim 22, wherein the mirror driver further comprises a reading unit configured to read a data frame identifier from one of a mirror hearer, a virtual local area network identifier (VID) field in the virtual local area network (VLAN) tag or 802.2 standard network access protocol (SNAP) org field.

27. The mirror driver according to claim 23, wherein the checksum is a cyclic redundancy checksum in the frame check sequence field.

28. The mirror driver according to claim 22, wherein the data structure is a hash table.

29. The mirror driver according to claim 22, wherein the index to the data structure is computed by a hash function.

30. The mirror driver according to claim 22, wherein the deleting unit is configured to delete timed-out pieces of key information from the data structure.

31. The mirror driver according to claim 30, wherein the deleting unit is configured to delete every key information comprising an older time stamp than a predetermined threshold value.

32. The mirror driver according to claim 22, wherein the communication networks refer to local area networks.

33. An apparatus for detecting duplicated frames in a mirrored data communication network system comprising at least two redundant physically separate networks, the apparatus comprising:
   creating and maintaining means for creating and maintaining at least one data structure comprising one or more entries, an entry comprising key information for each one of the received data frames;
   receiving means for receiving a data frame;
   computing means for computing an index to the data structure based on information acquired from the received data frame, the index pointing to an entry in the data structure;
   storing means for storing the key information of the received data frame on the entry, when the entry corresponding to the computed index is empty or the entry does not comprise key information matching the key information in the received data frame;
   forwarding means for forwarding the data frame to an upper software layer, when the entry corresponding to the computed index is empty or the entry does not comprise key information matching the key information in the received data frame;
   discarding means for discarding the received data frame, when the entry comprises the key information matching the key information in the received data frame; and
   deleting means for deleting key information from an entry, when the entry comprises the key information matching the key information in the received data frame.

* * * * *